(12) United States Patent
Litke et al.

(10) Patent No.: US 11,226,748 B2
(45) Date of Patent: Jan. 18, 2022

(54) DIFFERENTIATING OPEN AND ABANDONED TRANSACTIONS IN A SHARED STORAGE ENVIRONMENT

(71) Applicant: Red Hat Israel, Ltd, Raanana (IL)

(72) Inventors: Adam Litke, Bethel Park, PA (US); Nir Soffer, Raanana (IL); Liron Aravot, Ramat Gan (IL)

(73) Assignee: Red Hat Israel, Ltd, Raanana (IL)

( * ) Notice: Subject to any disclaimer, the term of this patent is extended or adjusted under 35 U.S.C. 154(b) by 33 days.

(21) Appl. No.: 15/201,706

(22) Filed: Jul. 5, 2016

(65) Prior Publication Data

US 2018/0011650 A1 Jan. 11, 2018

(51) Int. Cl.
*G06F 3/06* (2006.01)

(52) U.S. Cl.
CPC .......... *G06F 3/0622* (2013.01); *G06F 3/0604* (2013.01); *G06F 3/067* (2013.01); *G06F 3/0659* (2013.01); *G06F 3/0665* (2013.01)

(58) Field of Classification Search
None
See application file for complete search history.

(56) References Cited

U.S. PATENT DOCUMENTS

| 5,590,326 | A | * | 12/1996 | Manabe | G06F 9/52 |
| | | | | | 707/999.008 |
| 7,490,089 | B1 | * | 2/2009 | Georgiev | G06F 11/203 |
| 8,086,581 | B2 | | 12/2011 | Oshri et al. | |
| 8,121,980 | B2 | | 2/2012 | Reid et al. | |
| 8,677,065 | B1 | | 3/2014 | Cousins | |
| 8,700,585 | B2 | | 4/2014 | Vaghani et al. | |
| 2004/0220933 | A1 | * | 11/2004 | Walker | G06F 9/466 |
| 2005/0223164 | A1 | * | 10/2005 | Kitamura | G06F 21/10 |
| | | | | | 711/112 |
| 2006/0063501 | A1 | * | 3/2006 | Adkisson | G06F 12/0813 |
| | | | | | 455/230 |
| 2007/0078852 | A1 | * | 4/2007 | Chen | G06F 9/466 |
| 2007/0282838 | A1 | * | 12/2007 | Shavit | G06F 9/3004 |
| 2008/0256074 | A1 | * | 10/2008 | Lev | G06F 9/526 |

(Continued)

FOREIGN PATENT DOCUMENTS

CN 103399894 11/2013

OTHER PUBLICATIONS

IBM "Using GETMAIN Shared Storage" 1 page, https://www.ibm.com/support/knowledgecenter/SSGMCP_5.3.0/com.ibm.cics.ts.applicationprogramming.doc/topics/dfhp3t2.html.

(Continued)

*Primary Examiner* — Stephanie Wu
(74) *Attorney, Agent, or Firm* — Lowenstein Sandler LLP (57) ABSTRACT

Systems and methods for enhancing storage recollection in a shared storage system by enabling the recollection procedure to differentiate between open and abandoned transaction. An example method comprises: detecting, by a processing device, a transaction marker of a storage system, the transaction marker being stored on shared storage and indicating a modification of the shared storage is incomplete; determining, in view of a locking data structure on the shared storage, whether the transaction marker is associated with an abandoned modification; in response to the transaction marker being associated with an abandoned modification, releasing a portion of the shared storage associated with the abandoned modification; and destroying the transaction marker.

20 Claims, 5 Drawing Sheets

(56) References Cited

U.S. PATENT DOCUMENTS

| | | | | |
|---|---|---|---|---|
| 2010/0023521 A1* | 1/2010 | Arcese | ............... | G06F 16/2343 |
| | | | | 707/E17.007 |
| 2011/0161681 A1* | 6/2011 | Dhuse | ................ | G06F 11/1092 |
| | | | | 713/193 |
| 2012/0066193 A1* | 3/2012 | King | ................ | G06F 12/0269 |
| | | | | 707/704 |
| 2012/0254861 A1* | 10/2012 | Down, Jr. | ................ | G06F 8/63 |
| | | | | 718/1 |
| 2013/0332927 A1 | 12/2013 | Tang et al. | | |
| 2013/0346363 A1* | 12/2013 | Arakawa | ................ | G06F 16/27 |
| | | | | 707/610 |
| 2014/0040580 A1* | 2/2014 | Kripalani | ................ | G06F 3/065 |
| | | | | 711/162 |
| 2014/0089346 A1* | 3/2014 | Li | ...................... | G06F 21/6218 |
| | | | | 707/781 |
| 2014/0156716 A1* | 6/2014 | Baptist | .............. | G06F 17/30194 |
| | | | | 707/827 |
| 2014/0317115 A1 | 10/2014 | Pauly | | |
| 2015/0212760 A1 | 7/2015 | Goel et al. | | |
| 2015/0237132 A1* | 8/2015 | Antony | ............... | H04L 67/1095 |
| | | | | 709/224 |
| 2015/0248420 A1* | 9/2015 | Makkar | ............ | G06F 17/30088 |
| | | | | 707/649 |
| 2015/0280959 A1* | 10/2015 | Vincent | ............... | H04L 67/1097 |
| | | | | 709/203 |
| 2016/0070741 A1* | 3/2016 | Lin | ..................... | G06F 16/1774 |
| | | | | 707/624 |
| 2016/0092488 A1 | 3/2016 | Sun et al. | | |
| 2016/0299932 A1* | 10/2016 | Pound | ................. | G06F 16/2379 |

OTHER PUBLICATIONS

Oracle "Fusion Middleware Programming JTA for Oracle WebLogic Server—Managing Transactions" 13 pages, http://docs.oracle.com/cd/E14571_01/web.1111/e13731/trxman.htm#WLJTA173.

* cited by examiner

DIFFERENTIATING OPEN AND ABANDONED TRANSACTIONS IN A SHARED STORAGE ENVIRONMENT

TECHNICAL FIELD

The present disclosure is generally related to virtualized computer systems, and is more specifically related to virtual machine storage management.

BACKGROUND

Virtualization may be viewed as an abstraction of physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate. Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines. Processor virtualization may be implemented by the hypervisor scheduling time slots on one or more physical processors for a virtual machine, rather than a virtual machine actually having a dedicated physical processor. Memory virtualization may be implemented by employing a page table (PT) which is a memory structure translating virtual memory addresses to physical memory addresses.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are methods and systems for data storage management technology that enhances storage recollection in a shared storage system. Traditional storage systems modify data by performing create, retrieve, update, and delete operations (e.g., CRUD operations). Some storage systems may be shared by multiple clients and may involve complex modifications that involve a series of operations. At any given point in time, there may be many storage transactions accessing shared storage and while they are being processed, they may remain in an incomplete state. A transaction that is incomplete may be open and nearing completion, may never complete (e.g., due to power outages, network outages, hardware or software failures) or may have encountered a failure and may have been abandoned. Transactions that fail or never complete may leave the storage in a unpredictable state, and may result in wasted storage space.

Aspects of the present disclosure address the above and other deficiencies of traditional storage systems by distinguishing between storage transactions that are open and still being processed from those that are abandoned, and cleaning the abandoned storage transactions via a storage recollection procedure (e.g. garbage collection). In one example, the technology discussed herein may employ a combination of transaction markers and locking data structures to differentiate between open and abandoned transactions in a shared storage environment. The shared storage environment may include one or more devices with persistent data storage that can be accessed over a network. The transaction markers may be stored on the shared storage and may be any data that is capable of indicating a storage transaction has begun. The transaction marker may be created when a storage transaction is initiated and destroyed when the storage transaction completes. As a result, the presence of the transaction marker may indicate a storage transaction has not yet completed (i.e., incomplete).

The technology disclosed herein may scan the shared storage for the transaction markers to identify incomplete storage transactions and may distinguish between open transactions and abandoned transactions by accessing corresponding locking data structures. In one example, both the transaction markers and the locking data structures may be stored on the shared storage and may be accessed by a host performing a recollection procedure without communicating with other hosts directly. The locking data structures may indicate which hosts or portions of hosts (e.g., processes, threads) have access to the data storage portions associated with the incomplete storage transactions. For example, the host running a recollection procedure may access one or more locking data structures to determine whether a host that initiated the incomplete transaction has access to the data storage portion affected by the storage transaction. If the host no longer has access, then the storage transaction may be considered abandoned and the storage associated with the storage transaction may be released. If the host still has access, the incomplete transaction may still be open and should be provided time to complete.

The technology disclosed herein may be included within a distributed computer system (e.g., cloud computing network) that includes a plurality of host computer systems managed by a virtualization manager. Each host may be communicatively coupled, via a network, to shared storage that includes one or more storage domains that store disk images of virtual machines. A storage domain may refer to an atomic storage unit, such as a mount point or a folder for a file based storage, or a group of logical unit numbers (LUNs) for a block-based storage. In various illustrative examples, storage domains may employ file-based or block-based storage for storing one or more virtual machine disk images, the domain metadata and the domain lock. The domain metadata represents information that may be utilized for domain identification, management, creation, modification, removal, and/or other operations. The domain lock may represent information that may be utilized for managing access to the storage domain and may be implemented using one or more locking data structures.

Each disk image may comprise one or more volumes and each volume may comprise volume data, volume metadata, and volume locking data structure. The volume data may be employed for storing the disk image data. The volume metadata may be employed for storing references to associated volumes (e.g., to parent or child volumes in a copy-on-write chain) and/or other information that may be utilized for volume identification, management, creation, modification, removal, and/or for performing file operations with respect to the files stored on the volume. The volume locking data structure may be employed for storing the information that may be utilized for managing access to the volume.

The above-described multi-component structure of a volume results in complex storage-related operations, such as creating a volume, cloning a volume, or removing a volume. Therefore, each storage-related operation may involve a sequence of sub-operations to be performed on various objects of the storage domain. Some of those sub-operations may fail or never complete (e.g., due to power outages, network outages, hardware or software failures), thus leaving the storage in a non-predictable state. Certain recovery operations may need to be performed to detect and address such a failure, in order to avoid wasting storage and for keeping the storage in a coherent state.

Implementations of the present disclosure improve the operational efficiency of certain storage-related operations, including recollection procedures for cleaning failed attempts at modifying the shared storage, such as failed attempts at creating a volume, cloning a volume, or removing a volume, or other similar modification. In particular, aspects of the present technology may reduce the amount of storage space wasted due to abandoned storage transactions. In addition, present technology may also reduce the computing needs of hosts running recollection procedures (e.g., garbage collection) by performing the recollection procedure more efficiently. For example, if the recollection procedure is capable of determining that a transaction has been abandoned, the recollection procedure may clean it up and avoid repeatedly analyzing the transaction and waiting for it to complete or timeout. This may enable the recollection procedure to avoid relying on other less efficient mechanisms, such as waiting for the storage to be initialized before recollecting storage. Various aspects of the above referenced methods and systems are described in details herein below by way of examples, rather than by way of limitation.

Figure 1:
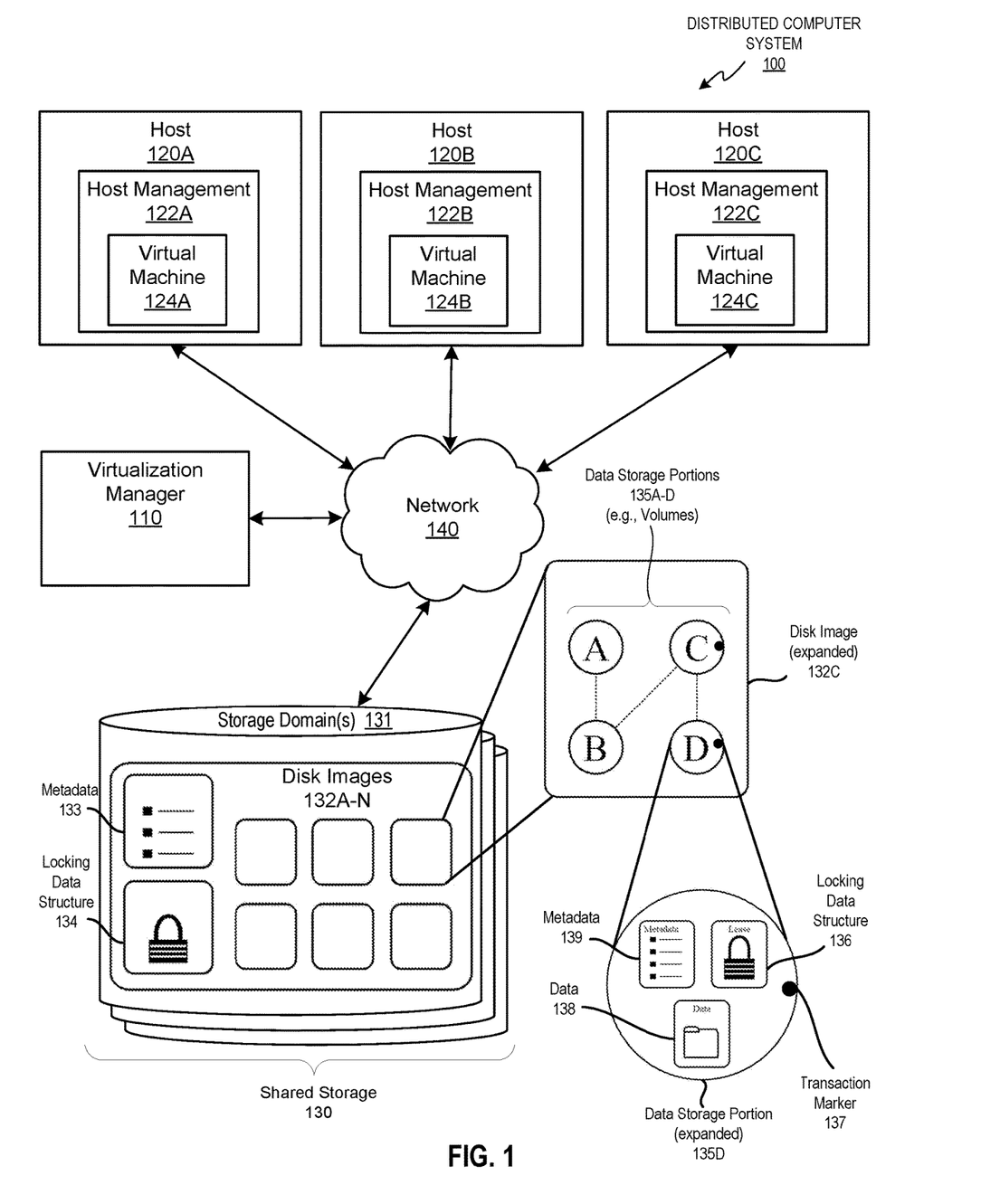
FIG. 1 depicts a high-level component diagram of one illustrative example of a distributed computer system representing a virtualized environment operating in accordance with one or more aspects of the present disclosure.

FIG. 1 depicts a high-level component diagram of one illustrative example of a distributed computer system 100 representing a virtualized environment in which systems and methods described herein may operate. In the illustrative example of FIG. 1, distributed computer system 100 comprises a virtualization manager 110, hosts 120A-C, and shared storage 130.

Virtualization manager 110 may include one or more software modules being executed by a host computer system for centralized management of the virtualized environment. Virtualization manager 110 may comprise various interfaces, including administrative interface, reporting interface, and/or application programming interface (API) to communicate to hosts 120A-C of the managed virtualized environment, as well as to user portals, databases, directory servers and various other components which are omitted from FIG. 1 for clarity.

Hosts 120A-C may be host computer systems that comprise one or more processors that are communicatively coupled to memory devices and input/output (I/O) devices, as described in more details herein below with references to FIG. 5. Each of the hosts 120A-C may run one or more virtual machines 124A-C, by executing a hypervisor to abstract the physical layer, including processors, memory, and I/O devices, and present this abstraction to the virtual machines as virtual devices. Each of the virtual machines 124A-C may execute a guest operating system which may utilize the underlying virtual devices, including virtual processors, virtual memory, and virtual I/O devices. One or more applications may be running on virtual machine 124 under the guest operating system. Each of the hosts 120A-C may run a host management module (e.g., 122A) that manages and monitors various aspects of the host operation, including the storage, memory and network interfaces. In an illustrative example, host management module 122A may be provided by a Virtual Desktop and Server Management (VDSM) daemon. In certain implementations, hosts 120A-C may be grouped into one or more logical groups which may be also referred to as "data centers" or "clusters." A data center may represent the highest level of abstraction in the virtualization model and may include one or more clusters. Hosts 120A-C may be communicatively coupled, via a network 140, to shared storage 130.

Shared storage 130 may include one or more storage domains 131 and each of the storage domains 131 may store disk images for virtual machines 124A-C. Example shared storage 130 may be employed for storing one or more virtual machine disk images 132A-N, metadata 133, and locking data structure 134. In an illustrative example, example shared storage 130 may employ file-based storage, in which case disk images 132A-N, metadata 133, and locking data structure 134 may be provided by respective files. In another illustrative example, example shared storage 130 may employ block-based storage, in which case disk images 132A-N, metadata 133, and locking data structure 134 may be provided by respective logical volumes.

Each of the disk images 132A-N may comprise one or more data storage portions 135A-D, as schematically illustrated by expanded disk image 132C. In an illustrative example, each data storage portion 135A-D may be a volume of data storage and a disk image may be represented by a volume chain comprising one or more copy-on-write (COW) volumes (which may also be referred to as "layers"). From the perspective of a virtual machine, these volumes appear as a single disk image, as the hypervisor presents the virtual disk to a virtual machine and implements the associated disk read-write operations. Initially, a virtual machine disk image may only comprise one raw or COW volume, which may be made read-only before the first boot of the virtual machine. An attempt to write to a disk by a virtual machine may trigger adding a new COW volume ("layer") to the volume chain. The newly created volume may be made writable, and may only store disk blocks or files which were modified or newly created by the virtual machine after the previous volume ("layer") had been made read-only. One or more volumes may be added to the volume chain during the lifetime of the virtual machine. Adding a new COW volume may be triggered by making the previous volume read-only (e.g., responsive to receiving a command via an administrative interface). The virtual disk device implemented by the hypervisor locates the data by accessing, transparently to the virtual machine, each volume of the chain of volumes, starting from the most recently added volume.

Each of the data storage portions 135A-C may comprise locking data structure 136, transaction marker 137, data 138, and metadata 139. In one example, data storage portion 135D may be implemented using file-based storage, in which case locking data structure 136, transaction marker 137, data 138, and metadata 139 may be provided by respective file system objects (e.g., file, directory, file name, or other object properties). In an another example, data storage portion 135D may be implemented using block-based storage, in which case locking data structure 136, transaction marker 137, data 138, and metadata 139 may be provided by segments of respective logical volumes storing metadata and other information (e.g., tags) for a plurality of the storage domain volumes. The logical volume segments may be identified by an offset with respect to the logical volume starting block or by an index within an array of pointers identifying the logical volume segments corresponding to the storage domain volumes.

As shown in FIG. 1, there may be multiple locking data structures 134, 136 and they may be organized into different layers for managing access to data at different levels of granularity. For example, locking data structure 134 may be used for managing access to storage domains 131 or specific disk images 132A-N, and locking data structure 136 may be used for managing access to data storage portions 135A-D. Storage domains 131 may include data storage portions 135 and therefore storage domains 131 may be considered to be at a higher level (e.g., coarser or less granular level) then data storage portion 135D, which may be at a lower level (e.g., finer or more granular level). Each of the locking data structures 134, 136 may be employed for storing the information that indicates whether the corresponding portion of shared storage is locked and in some examples may indicate which host possesses the lock.

Locking data structures 134, 136 may be stored in the same storage domains, that store some or all of the resources that the locking data structures protect. Accordingly, a current lock state for any resource can be determined simply by reading the locking data structure associated with that resource in the storage domain to determine whether a particular resource has an exclusive lock, a shared lock, or is free of locks. This may enable locking to be performed with or without the use of any centralized locking mechanism and may also enable a host to obtain a lock without communicating with another host or with the virtualization manager 110.

Each of the locking data structures may include multiple portions. A first portion may enable a host to acquire a lock on a specific Host ID and a second portion may enable the host to acquire a lock on a specific portion of data in view of the Host ID. Each portion may include a set of flags, such as a bitmap. For example, the first portion may include a plurality of flags and each flag may correspond to both a specific data portion and a specific host ID, such that, setting a single flag may indicate the data portion that is locked and the host ID that acquired the lock.

Each portion of a locking data structure may be accessed and modified using a locking mechanism. The locking mechanism may also be referred to as a leasing mechanism and may be based on a consensus mechanism (e.g., consensus protocol). Each of the portions of the locking data structure may use the same locking mechanism or a different locking mechanism. For example, the first portion may be accessed using a locking mechanism based on a delta lease mechanism that may involve a regular exchange of messages (e.g., input/output operations) to shared storage to confirm that the host is alive. Acquiring a delta lease (i.e., lock) may involve performing reads and writes to a particular sector (e.g., block) of storage separated by specific delays. Once acquired, a delta lease may be periodically renewed by updating a timestamp in the sector. Granting leases to host IDs may prevent two hosts from using the same host ID and may provide basic host liveliness information in view of the renewals. The second portion may be accessed using a locking mechanism based on a Paxos protocol. The Paxos protocol (e.g., Disk Paxos) may be used to acquire an exclusive lock even if there are multiple hosts attempting to acquire the lock. Paxos may involve reading and writing to the locking data structure during a voting phase and a commit phase and may include multiple rounds before a specific host is granted the lock.

The locking data structure and locking mechanisms may be used to obtain a lock on a portion of data and the lock may be referred to as a lease. The lease may provide exclusive access to a portion of data (e.g., volume) and may prevent other hosts from accessing the portion of data while the lease is active. A lease may have a certain expiration period and may be extended by the requestor. Failure to timely extend a lease may lead to the expiration of the lease. The state of the current lease with respect to a given volume may be stored in the locking data structure associated with the volume.

Data area 138 of data storage portion 135D may be employed for storing the disk image data. The metadata area 139 may be employed for storing references to associated volumes (e.g., to parent or child volumes in a copy-on-write chain) and/or other information that may be utilized for volume identification, management, creation, modification, removal, and/or for performing file operations with respect to the files stored on the volume.

Transaction markers 137 indicate that a transactional mode of execution is underway. In certain implementations, a transaction may be opened by creating a transaction marker, as described in more details herein below. Subsequent operations may be performed in the transactional mode of execution, i.e., such operations may either collectively succeed or collectively fail. Each operation to be performed in the transactional mode of execution may be represented by either an atomic operation (in other words, an operation that is completely isolated from the rest of the system and cannot be interfered with by any concurrently executing processes) or by a nested transaction. The transaction may be completed by destroying the transaction marker, as described in more details herein below.

In file-based storage implementations, the transaction marker may be represented by a file that has a known file name (e.g., a pre-defined extension). The storage objects that are created or modified within the scope of the transaction may be associated with the marker by their respective file names. In certain implementations, a volume may be identified by a unique alphanumeric identifier, such as a Universally Unique Identifier (UUID). The name of the volume data file may be derived from the UUID by a first pre-defined transformation (e.g., may be represented by the UUID string with no extension). The name of the volume lease file may be derived from the UUID by a second pre-defined transformation (e.g., may be represented by the UUID string concatenated with a pre-defined extension, such as UUID.lease). The name of the volume metadata file may be derived from the UUID by a third pre-defined transformation (e.g., may be represented by the UUID string concatenated with a pre-defined extension, such as UUID-.meta). The transaction marker may be created by renaming the volume metadata file using a fourth pre-defined transformation (e.g., the UUID string concatenated with the first pre-defined extension identifying the metadata file and a second pre-defined extension identifying the transaction marker, such as UUID.meta.tmp), and may be destroyed by reversing the rename operation (e.g., removing the second pre-defined extension).

In block-based storage implementations, the transaction marker may be represented by a known tag associated with a logical volume. The volume metadata and volume locking data structure may be provided by segments of respective logical volumes storing metadata and lock information for a plurality of the storage domain volumes. The logical volume segments may be identified by an index within an array of pointers identifying the logical volume segments corresponding to the storage domain volumes. The transaction marker may be created by creating a logical volume representing the volume data with a specified tag, and may be destroyed by removing the tag from the logical volume.

In an illustrative example, a volume create operation may be performed in the transactional mode of execution. Responsive to successfully acquiring a lock with respect to the storage domain containing the volume being created, the virtualization manager may initiate the transactional mode of execution by creating the transaction marker. As noted herein above, in the file-based storage implementations, the transaction marker may be represented by a volume metadata file, the file name of which has a pre-defined extension. In the block-based storage implementations, the transaction marker may be represented by a known tag associated with a logical volume implementing the volume data.

Upon successfully creating the transaction marker, the virtualization manager may create the remaining components of the volume. In the file-based storage implementations, the data file and locking file may be created. In the block-based storage implementations, the metadata and lock may be created by allocating segments of respective logical volumes storing metadata and lock information for a plurality of the storage domain volumes. The logical volume segments may be identified by an index within an array of pointers identifying the logical volume segments corresponding to the storage domain volumes.

Upon completing the above-described other operations associated with volume creation, the virtualization manager may complete the transaction by destroying the transaction marker. In the file-based storage implementations, the transaction marker may be destroyed by removing a pre-defined extension from the name of the volume metadata file. In the block-based storage implementations, the transaction marker may be destroyed by removing a pre-defined tag from the logical volume representing the volume data. Upon successfully destroying the transaction marker, the virtualization manager may release the previously acquired lock with respect to the storage domain containing the newly created volume.

The above-described multi-component structure of a volume results in complex storage-related operations, such as creating a volume, cloning a volume, or removing a volume. Therefore, each storage-related operation may involve a sequence of sub-operations to be performed on various objects of the storage domain. Some of those sub-operations may fail or never complete (e.g., due to power outages, network outages, hardware or software failures). Certain recovery operations may need to be performed in response to detecting such a failure, in order to avoid wasting storage.

In accordance with one or more aspects of the present disclosure, certain storage-related operations, including but not limited to creating a volume, cloning a volume, or removing a volume, may be performed in the transactional mode of execution, such that a failed or incomplete transaction would be removed, thus leaving various storage objects in their respective pre-transactional states. In accordance with one or more aspects of the present disclosure, a recollection procedure (also referred to as "garbage collector") may be employed to clean incomplete transactions that may have left various storage objects on the shared storage.

The recollection procedure may be executed by one or more recollection processes or garbage collection processes that may run on one or more of the host devices, client devices, shared storage devices, or other device or combination of computing devices. The recollection procedure may be initiated in view of at least one of a schedule, a duration of time, or an event. In one example, the shared storage may be accessed by a plurality of hosts and a first host may perform at least a portion of the modification (e.g., transaction) of the shared storage and a second host may perform at least a portion of the recollection procedure. In another example, the processing device may execute a multithreaded computing process comprising a first thread that performs at least a portion of the modification of the shared storage and a second thread that performs at least a portion of the recollection procedure.

In accordance with one or more aspects of the present disclosure, the recollection procedure may be performed by processes of a computing device that can be executed independently from the processes that execute the storage-related transactions. In one example, each of the hosts 120A-C may execute a recollection procedure. In another example, the recollection procedure may be centrally managed and/or executed by virtualization manager 110. The computing devices (e.g., host 120A-C or virtualization manager 110) may run the recollection procedure periodically, responsive to detecting a certain event, or evaluating a certain condition (e.g., free disk space falling below a specified threshold). The computing device may specify a storage area (e.g., storage domain 131 or a disk image 132C) to be scanned by an instance of the recollection process. Upon initialization, the recollection process instance may scan the specified storage area to identify any transaction markers.

The recollection process may compile a list of the identified transaction markers and then acquire a lock with respect to the specified storage area. Upon successfully acquiring the lock, the recollection process may re-examine the states of the markers on the list and drop from the list any marker that was modified (e.g., renamed to a different file name) by another process before the lock had been acquired by the recollection process. Therefore, the markers remaining on the list reference abandoned or failed transactions, since a marker referencing an active transaction would be protected by a lock that was previously acquired by the process performing the transaction.

The recollection process may then retrieve a marker from the list and identify the storage objects referenced by the marker. As noted herein above, the transaction marker may be represented by the volume metadata file having its filename (which may be provided the volume identifier string concatenated with a first pre-defined extension identifying the metadata file, e.g., UUID.meta) concatenated with a second pre-defined extension that identifies the transaction marker, e.g., UUID.meta.tmp. The name of the volume data file may be derived from the volume identifier by a first pre-defined transformation (e.g., may be represented by the volume identifier string with no extension). The name of the volume lease file (e.g., locking data structure) may be derived from the volume identifier by a second pre-defined transformation (e.g., may be represented by the volume identifier string concatenated with a pre-defined extension, such as UUID.lease).

In block-based storage implementations, the transaction marker may be represented by a known tag associated with a logical volume. The volume metadata area and volume lease area may be provided by segments of respective logical volumes storing metadata and lease information for a plurality of the storage domain volumes. The logical volume segments may be identified by an index within an array of pointers identifying the logical volume segments corresponding to the storage domain volumes. The transaction marker may be created by creating a logical volume representing the volume data area with a specified tag, and may be destroyed by removing the tag from the logical volume.

Responsive to successfully identifying the storage objects referenced by the transaction maker, the recollection process may destroy the identified storage objects, and may then execute an atomic operation to destroy the transaction marker. As noted herein above, in the file-based storage implementations, the transaction marker may be destroyed by removing a file or by removing a pre-defined extension from the name of the volume metadata file. In the block-based storage implementations, the transaction marker may be destroyed by removing the a logical or by removing a pre-defined tag from the logical volume representing the volume data area. Upon successfully destroying the transaction markers on the list, the garbage collector may release the previously acquired lock with respect to the specified storage area.

While example systems and methods are described herein with references to various components of distributed computer system 100, such systems and methods may also operate in distributed storage systems whose architecture may be different from that of system 100, provided that such distributed storage systems implement a pair of atomic creating and object deleting operations.

Figure 2:
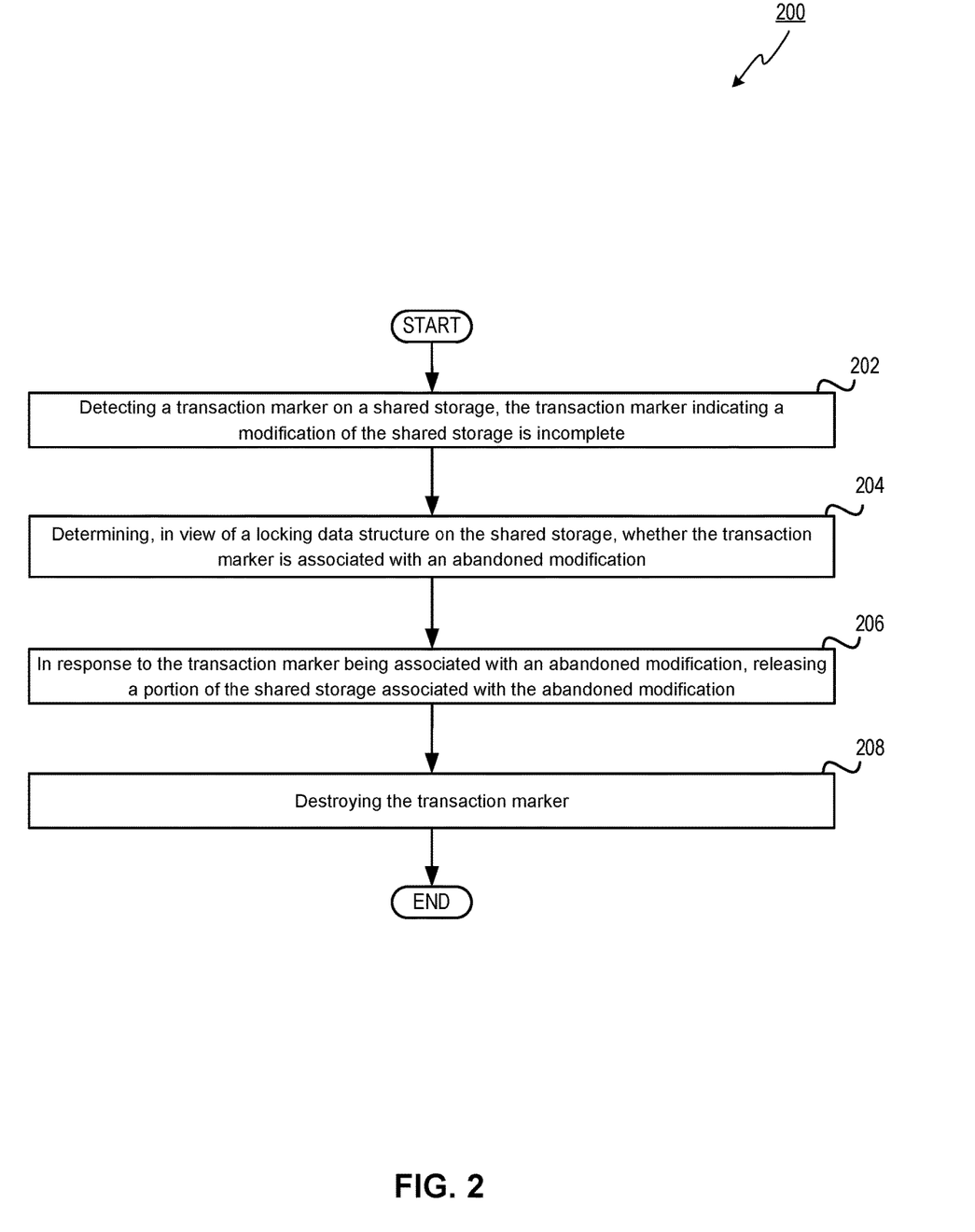
FIG. 2 depicts a flow diagram of an example method for performing a recollection procedure that distinguishes between open and abandoned modifications, in accordance with one or more aspects of the present disclosure.
Figure 3:
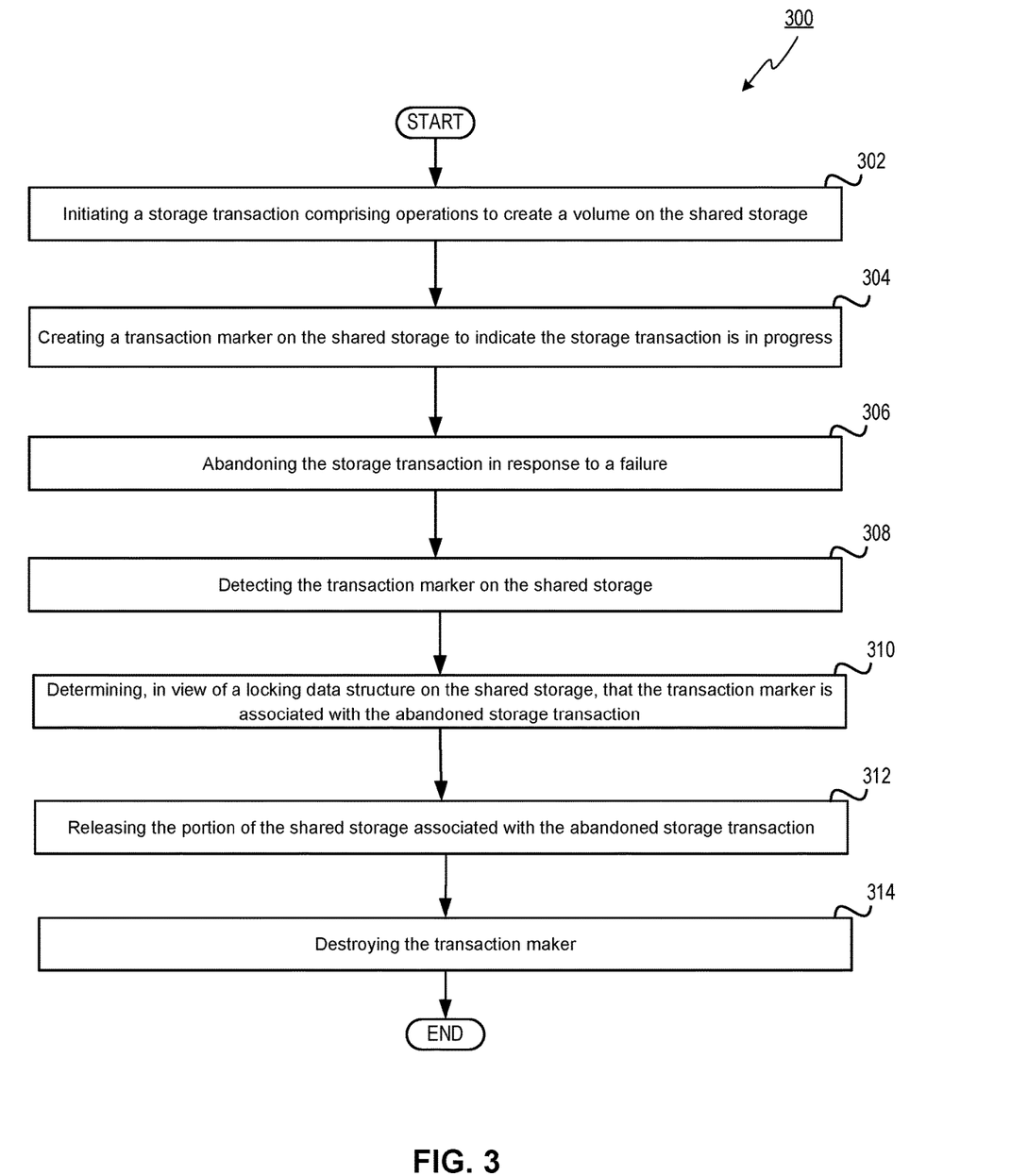
FIG. 3 depicts a flow diagram of another example method for performing a recollection procedure that distinguishes between open and abandoned modifications, in accordance with one or more aspects of the present disclosure.

FIGS. 2 and 3 depict flow diagrams for illustrative examples of methods 200 and 300 for performing a recollection procedure that is able to distinguish between storage modifications that are currently open and storage modifications that have been abandoned, in accordance with one or more aspects of the present disclosure. Method 300 may be similar to method 200 and may include additional implementation details. Methods 200 and 300 may be performed by processing devices that may comprise hardware (e.g., circuitry, dedicated logic), computer readable instructions (e.g., run on a general purpose computer system or a dedicated machine), or a combination of both. Methods 200 and 300 and each of their individual functions, routines, subroutines, or operations may be performed by one or more processors of the computer device executing the method. In certain implementations, methods 200 and 300 may each be performed by a single processing thread. Alternatively, methods 200 and 300 may be performed by two or more processing threads, each thread executing one or more individual functions, routines, subroutines, or operations of the method. In an illustrative example, the processing threads implementing the method may be synchronized (e.g., using semaphores, critical sections, and/or other thread synchronization mechanisms). In another example, the processing threads implementing the method may be executed asynchronously with respect to each other.

Figure 4:
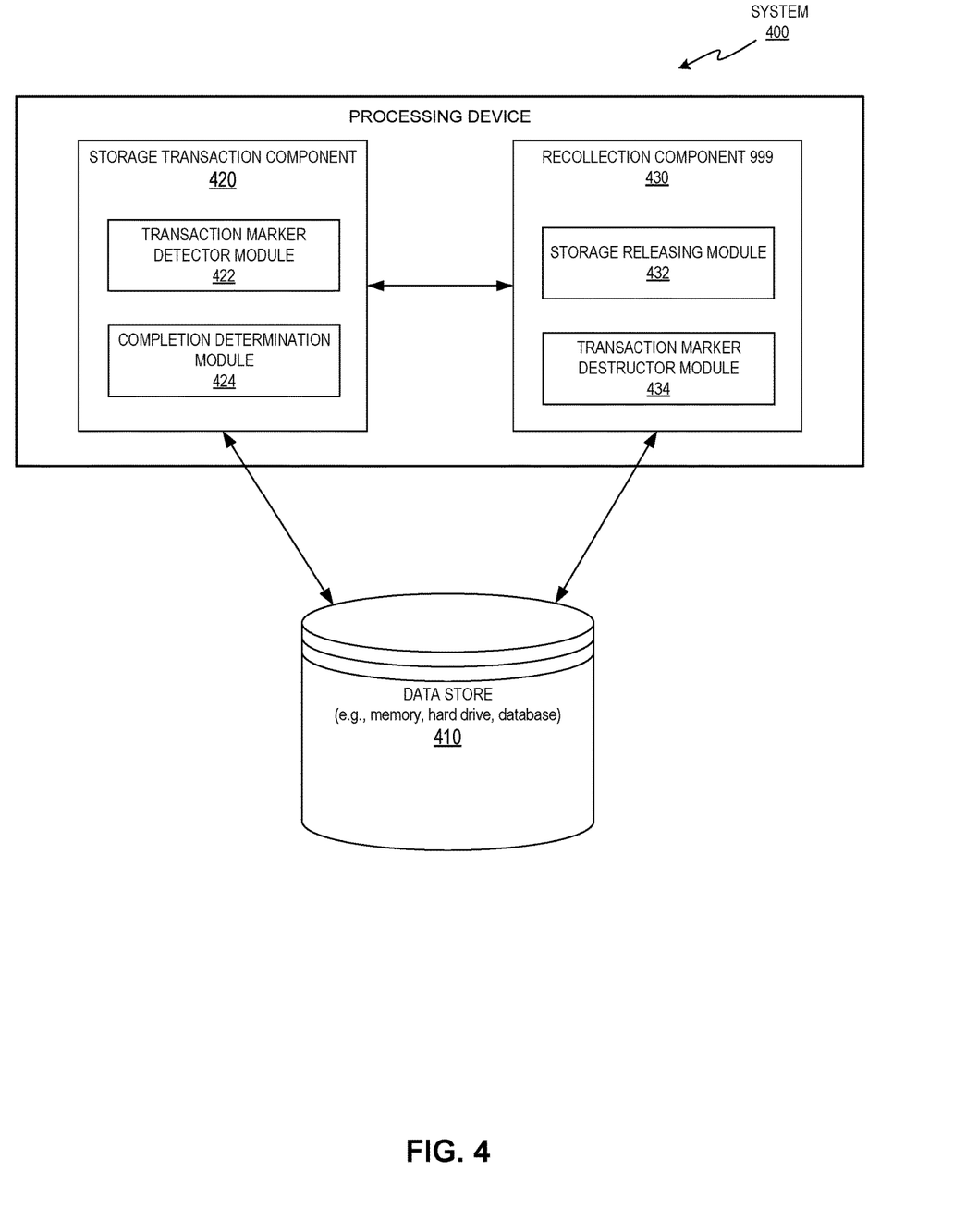
FIG. 4 depicts a block diagram of an illustrative computing device operating in accordance with the examples of the present disclosure.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be needed to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, methods 200 and 300 may be performed by virtualization manager 110, hosts 120A-D, system 400, or system 500 as shown in FIGS. 1, 4, and 5 respectively.

Referring to FIG. 2, method 200 may be performed by processing devices of a computing device and may begin at block 202. At block 202, a processing device may detect a transaction marker of a storage system. The transaction marker may be stored on shared storage and may indicate a modification of the shared storage is incomplete. Being that multiple transactions can occur in parallel (e.g., concurrently, simultaneously), the detection process may identify a plurality of transaction markers. Some of the transaction markers may correspond to incomplete modifications that have been abandoned and other transaction markers may correspond to incomplete modifications that are still open and may subsequently complete. Each of the transaction markers may correspond to a specific data storage portion, such as a particular volume, disk image, storage domain or other portions of shared storage. For ease of explanation, the below examples discuss transaction markers that correspond to particular volumes on shared storage. The shared storage may be persistent data storage (e.g., hard disk, flash, tape) that is accessed by the processing device over a network connection or may be accessed by the processing device without traversing a network connection (e.g., directly attached, locally accessible). In one example, the storage system may be a distributed storage system (e.g., distributed file system) and the shared storage may include a block-level storage device and/or a file-level storage device. When a file-level storage device is being used, the transaction marker may be provided by a metadata file having a pre-defined filename extension. When a block-level storage device is being used, the transaction marker may be provided by a pre-defined tag associated with a logical volume implementing a data area of a new volume.

The process for detecting the transaction marker may vary depending on whether file-level or block-level types of storage are used. In either case, the processing device may detect the transaction markers by accessing the shared storage. Accessing the shared storage to detect the transaction markers may involve querying, scanning, analyzing, inspecting or other information retrieval process to identify the transaction markers. When the shared storage includes block-level storage, the processing device may query the shared storage for the pre-defined tag and receive a response with a set of identification information for one or more logical volumes associated with the pre-defined tag. The set of identification information may be a list of unique identifiers that correspond to the volumes or other portions of data storage (e.g., storage domains, disk images, volumes, sectors, blocks). In another example, the processing device may access or iterate over one or more of the data storage portions (e.g., every volume) associated with a particular disk image, storage domain, or other portion of the shared storage and inspect the data storage portion to determine if it is associated with the pre-defined tag.

When the shared storage includes file-level storage, the processing device may query the shared storage for files that have a pre-defined filename extension and may receive a response with a set of files or a set of volumes associated with the specified files. In addition or alternatively, the processing device may iterate through files within one or more of the volumes (e.g., every volume) associated with a particular disk image, storage domain, or other portion of the shared storage and check whether the volume contains or is associated with a file having the pre-defined filename extension.

The processing device may then store the identifiers for the one or more data storage portions associated with the transaction markers. In one example, it may store the identifiers for the data storage portions (e.g., volumes) within a list of incomplete modifications. The processing device may update the list to exclude modifications that are open (e.g., in progress) and may leave the modifications that are abandoned.

At block 204, the processing device may determine, in view of a locking data structure on the shared storage, whether the transaction marker is associated with an abandoned modification. Determining whether the transaction marker is associated with an abandoned modification may involve identifying a data storage portion corresponding to the transaction marker and accessing the locking data structure that is associated with the determined data storage portion. In one example, accessing the locking data structure may involve inspecting or analyzing the locking data structure without attempting to modify the locking data structure. In another example, accessing the locking data structure may involve initiating a request for a lock (e.g., an exclusive lock) on the data storage portion using the locking data structure on the shared storage. In either example, the processing device may detect the data storage portion is unlocked and may determine the modification is an abandoned modification. This may be because when the data portion is unlocked, the modification of the data portion may be prohibited and therefore the modification may not be in progress. This may occur when a modification that previously had a lock, has lost the lock and been abandoned. As discussed above, the locking mechanism may include a timeout feature that removes a host's lock if it did not refresh its lock (e.g., lease) within a predefined threshold time period.

At block 206, the processing device may, in response to the transaction marker being associated with an abandoned modification, release a portion of the shared storage associated with the abandoned modification. Releasing the portion of the shared storage may first involve identifying which portions of the shared storage are associated with the modification. In the examples discussed above, the modifications may be storage transactions that create, modify, or remove volumes and the modifications may create or modify particular data objects within shared storage. After identifying the transaction marker, the processing device may search for corresponding data objects and analyze the data objects to determine which portions of the shared storage were affected by the modification. The processing device may then inspect these portions and release or de-allocate storage space associated with the affected portions of data storage.

The abandoned modification may have allocated new data storage as well as modified existing data storage. The portions that were allocated may be de-allocated but the portions that were modified may be unmodified (e.g., undone, rolled back). For example, if the modification involved adding a new volume, there may be an index or mapping data structure that includes a reference to portions of the new volume. In this situation, releasing a portion of the shared storage associated with the abandoned modification may involve modifying the index or mapping data structure to remove one or more of the references.

At block 208, the processing device may destroy the transaction marker. Destroying the transaction marker may involve acquiring and releasing a lock using the locking data structure. The locking data structure may be the same locking data structure accessed to determine whether the modification was abandoned or may be a different locking data structure. The different locking data structure may be a locking data structure at a different layer, which may correspond to different levels of storage. For example, there may be locking data structure corresponding to a storage domain level, a disk image level, a volume level, a sub-volume level, another level of storage, or a combination thereof. In one example, the processing device may acquire the lock to the shared storage prior to releasing the portion of the shared storage associated with the abandoned modification and may relinquish the lock after destroying the transaction marker. Responsive to completing the operations described herein above with references to block 208, the method may terminate.

Referring to FIG. 3, method 300 may be performed by processing devices of a computing device and may begin at block 302. At block 302, a processing device may initiate a storage transaction comprising operations to create a volume in a storage system that comprises shared storage. The storage transaction may be an example of a modification of shared storage and may include multiple operations. Each operation may be performed in a transactional mode of execution that may reduce the possibility that a second transaction may interfere with the execution of operations in the first transaction while the first transaction is open. The shared storage may comprise multiple virtual disk images and may be accessed over a network by a plurality of hosts. Each host may include or comprise a virtual machine accessing one of the virtual disk images. In one example, the storage transaction for creating a volume on the shared storage may also associate the volume with a new or existing virtual disk image.

At block 304, the processing device may create a transaction marker on the shared storage to indicate a storage transaction is in progress. The transaction marker may indicate that a transaction has begun and, may be present until the transaction has been completed during normal operation. Therefore, the presence of the transaction marker may indicate the transaction is incomplete (e.g., an open transaction or an abandoned transaction).

At block 306, the processing device may abandon the storage transaction in response to a failure. The failure may include, for example, one or more of transmission failures (e.g., networking failure), host failures (e.g., power loss, operating system failure, application failure), storage failures (e.g., insufficient storage space, permission errors, data corruption), other failure, or combination thereof. In one example, a host performing the storage transaction may fail (e.g., crash) and after a reboot the host may not reinitiate the storage transaction and the storage device may release the lock associated with the storage transaction.

At block 308, the processing device may detect the transaction marker on the shared storage. Block 308 may be similar to block 202 and may involve accessing the shared storage. Accessing the storage may involve querying, scanning, or other information retrieval process to identify the transaction markers. In one example, the shared storage may comprise the transaction marker, the locking data structure, and the data storage portion that is modified by the abandoned modification and is associated with the locking data structure.

At block 310, the processing device may determine, in view of a locking data structure on the shared storage, that the transaction marker is associated with the abandoned storage transaction. Block 310 may be the same or similar to block 204 and the determination may involve identifying a data storage portion corresponding to the transaction marker and accessing the locking data structure associated with the determined data storage portion. The locking data structure may be on the shared storage, which may enable a plurality of hosts to acquire exclusive access to a portion of the shared storage without communicating with one another. The plurality of hosts may acquire exclusive access by using a first portion of the locking data structure to acquire exclusive access to a unique host ID and using a second portion of the locking data structure to acquire exclusive access to the portion of the shared storage using the unique host ID.

At block 312, the processing device may release a portion of the shared storage associated with the abandoned storage transaction. Releasing the portion of the shared storage may involve identifying which portions of the shared storage may be associated with the storage transaction. The processing device may also search for corresponding data objects and analyze the data objects to determine which portions of the shared storage were affected by the modification. The processing device may then inspect these portions and release or de-allocate storage space associated with the affected portions of data storage.

At block 314, the processing device may destroy the transaction marker. Destroying the transaction maker may involve removing the transaction marker from shared storage. The manner in which the transaction marker is destroyed may depend on whether file-level or block-level types of storage are used. When the shared storage includes block-level storage, the processing device may destroy the transaction marker by removing the portion of data storage (e.g., volume) or by removing a pre-defined tag associated with a portion of data storage. When shared storage includes file-level storage, the processing device may destroy the transaction marker by removing the file within the portion of the data storage or by altering a pre-defined filename extension of the file within the portion of the data storage. The alteration may involve removing the file having the pre-defined filename extension, renaming the file name (e.g., remove filename suffix or prefix), other operation (e.g., moving file) or combination of operations. In one example, the process of creating the transaction marker and destroying the transaction marker may each be performed atomically. Responsive to completing the operations described herein above with references to block 314, the method may terminate.

FIG. 4 illustrates an example system 400 in which implementations of the disclosure may operate. System 400 may be the same or similar to one of the hosts 120A-D, virtualization manager 110, a storage device within shared storage 130, or other computing device within a distributed computing system. System 400 may include components and modules for performing a recollection procedure to recapture storage space on the shared storage. In the example shown in FIG. 2, system 400 may include a data store 410, a storage transaction component 420, and a recollection component 430. Data store 410 may include any non-persistent data storage (e.g., memory), persistent data storage (e.g., flash storage, hard drive, tape), other medium, or combination thereof that is capable of storing instructions for carrying out the operations of the components and module discussed herein.

Storage transaction component 420 may analyze data on shared storage to locate abandoned storage transactions. Storage transaction component 420 may include a transaction marker detector module 422 and a completion determination module 424.

Transaction marker detector module 422 may access shared storage to detect one or more transaction markers of a storage system. Each of the transaction markers may indicate a modification of the shared storage is incomplete and may correspond to a specific data storage portion, such as a particular volume, disk image, storage domain or other portions of shared storage. Detecting the transaction marker may involve querying, scanning, or other information retrieval process to identify the transaction markers and may vary depending on whether file-level or block-level types of storage are in use. When the shared storage includes block-level storage, the processing device may query the shared storage for the pre-defined tag and receive a response with a set of identification information for one or more logical volumes associated with the pre-defined tag. The set of identification information may be a list of unique identifiers that correspond to the volumes or other portions of data storage (e.g., storage domain, image, sector). When the shared storage includes file-level storage, the processing device may query the shared storage for files that have a pre-defined filename extension and may receive a response with a set of files or a set of volumes associated with the specified files. In another example, the processing device may access files within one or more of the volumes (e.g., every volume) associated with a particular disk image, storage domain, or other portion of the shared storage and check to see if the volume is associated with the pre-defined filename extension.

Completion determination module 424 may be informed of the one or more transaction markers from transaction marker detector module 422 and may determine whether the transaction markers are associated with modifications (e.g., storage transactions) that are abandoned. Determining whether the transaction marker is associated with an abandoned modification may involve identifying a data storage portion corresponding to the transaction marker and accessing the locking data structure that is associated with the determined data storage portion. When the locking data structure indicates the data storage portion is locked, completion determination module 424 may determine the modification is an abandoned modification. When the locking data structure indicates the data storage portion is unlocked, completion determination module 424 may determine that the modification is not abandoned (i.e., opened) or that there is not enough information to conclude that it is abandoned.

Completion determination module 424 may include additional analysis when the data storage portion is locked. In one example, completion determination module 424 may analyze the locking data structure to determine if the host associated with the abandoned locking data structure is the host that has the lock. In another example, completion determination module 424, may analyze additional locking data structures within layered locking data structures. This may enable detecting locks at a more granular level (e.g., finer detection). For example, a host that initiated the storage transaction may have a lock to a storage domain but not the disk image that includes the volume affected by the storage transaction. Therefore, although a lock was detected there was no lock on the volume affected and therefore the storage transaction is determined to be abandoned.

Recollection component 430 may include a storage releasing module 432 and a transaction marker destructor module 434. Storage releasing module 432 may release a portion of the shared storage associated with the abandoned modification in response to the transaction marker being associated with an abandoned modification. Releasing the portion of the shared storage may involve identifying which portions the shared storage may be associated with the modification. In one example, storage releasing module 432 may search for data objects and analyze the data objects to determine which portions of the shared storage were affected by the abandoned modification. Storage releasing module 432 may then inspect these portions and release or de-allocate storage space associated with the affected portions of data storage.

Transaction marker destructor module 434 may destroy the transaction marker. Destroying the transaction marker may involve acquiring and releasing a lock using the locking data structure. The locking data structure may be the same locking data structure accessed to determine whether the modification was abandoned or may be a different locking data structure. The different locking data structure may be a locking data structure at a different. For example, there may be locking data structure corresponding to a storage domain level, a disk image level, a volume level, a sub-volume level, another level of storage, or a combination thereof. In one example, the processing device may acquire the lock to the shared storage prior to releasing the portion of the shared storage and relinquish the lock after destroying the transaction marker.

Figure 5:
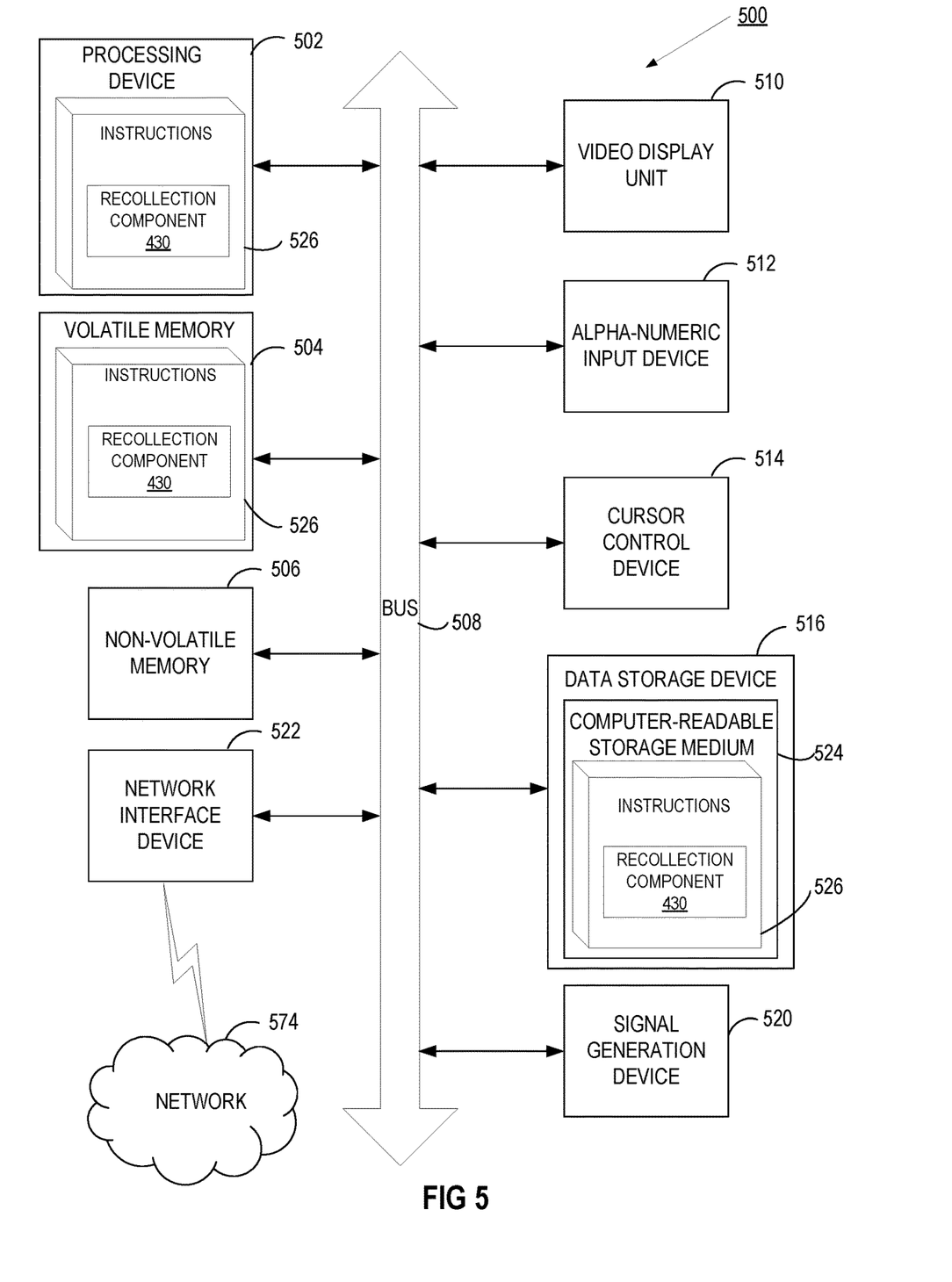
FIG. 5 depicts a block diagram of another illustrative computing device operating in accordance with the examples of the present disclosure.

FIG. 5 depicts a block diagram of a computer system operating in accordance with one or more aspects of the present disclosure. In various illustrative examples, computer system 500 may correspond to a host 120A or virtual manager 110 of FIG. 1. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host machine to translate these requests to the underlying physical computing hardware resources. This type of virtualization results in multiple VMs sharing physical resources.

In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processing device 502, a volatile memory 504 (e.g., random access memory (RAM)), a non-volatile memory 506 (e.g., read-only memory (ROM) or electrically-erasable programmable ROM (EEPROM)), and a data storage device 516, which may communicate with each other via a bus 508.

Processing device 502 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 522. Computer system 500 also may include a video display unit 510 (e.g., an LCD), an alpha-numeric input device 512 (e.g., a keyboard), a cursor control device 514 (e.g., a mouse), and a signal generation device 520.

Data storage device 516 may include a non-transitory computer-readable storage medium 524 on which may store instructions 526 encoding any one or more of the methods or functions described herein, including instructions encoding recollection component 410 of FIG. 4 for implementing methods 200 or 300.

Instructions 526 may also reside, completely or partially, within volatile memory 504 and/or within processing device 502 during execution thereof by computer system 500, hence, volatile memory 504 and processing device 502 may also constitute machine-readable storage media.

While computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "detecting," "determining," "releasing," "destroying," "initiating," "creating," "abandoning," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 200 or 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   accessing, by a processing device of a first client, a transaction marker that is stored on a portion of shared persistent storage and that indicates a modification of the portion by a second client is incomplete, wherein the transaction marker is accessible over a network by multiple clients and comprises a pre-defined tag of a logical volume of the portion or a pre-defined filename extension of the portion;
   accessing, by the first client, a locking data structure associated with the portion of the shared persistent storage, wherein the locking data structure is stored on the shared persistent storage;
   detecting, by the first client in view of the locking data structure, that the portion of the shared persistent storage is unlocked;
   determining, by the first client in view of the locking data structure and the transaction marker, that the modification of the shared persistent storage is abandoned by the second client;
   releasing, by the first client, the portion of the shared persistent storage associated with the modification by the second client; and
   destroying, by the first client, the transaction marker.

2. The method of claim 1, wherein the first client comprises a device that functions as a storage client of the shared persistent storage.

3. The method of claim 1, further comprising identifying a plurality of transaction markers, a first transaction marker corresponding to the incomplete modification that is abandoned and a second transaction marker corresponding to an incomplete modification that is open and will complete.

4. The method of claim 1, wherein the modification that is abandoned comprises a storage transaction for creating a volume on the shared persistent storage and associating the volume with a virtual disk image.

5. The method of claim 1, wherein determining that the modification is abandoned by the second client comprises the first client determining that the portion of the shared persistent storage comprises the transaction marker and is free of a lock by the second client.

6. The method of claim 1, wherein detecting that the portion of the shared persistent storage is unlocked comprises initiating, by the first client, a request for an exclusive lock on the portion using the locking data structure on the shared persistent storage.

7. The method of claim 1, wherein the transaction marker comprises a metadata file having the pre-defined filename extension.

8. The method of claim 1, wherein the transaction marker comprises the pre-defined tag associated with the logical volume of a virtual disk image.

9. The method of claim 1, further comprising:
   acquiring a lock to the shared persistent storage prior to releasing the portion of the shared persistent storage associated with the modification that is abandoned; and
   relinquishing the lock to the shared persistent storage after destroying the transaction marker.

10. The method of claim 1, wherein the shared persistent storage comprises at least one of a block-level storage device or a file-level storage device.

11. The method of claim 1, wherein the transaction marker, the locking data structure, and the portion are stored by the shared persistent storage and are all accessible over the network by the multiple clients, and wherein the portion of the shared persistent storage was modified by the modification that is abandoned.

12. The method of claim 1, wherein the shared persistent storage comprises multiple virtual disk images and is accessed over the network by a plurality of hosts, each host comprising a virtual machine accessing at least one of the virtual disk images.

13. The method of claim 1, wherein the method comprises a recollection procedure to recapture storage space on the shared persistent storage.

14. The method of claim 1, wherein the first client and the second client each perform a modification of the shared persistent storage and perform a recollection procedure.

15. The method of claim 13, wherein the processing device executes a multithreaded computing process comprising a first thread that performs the modification of the shared persistent storage and a second thread that performs at least a portion of the recollection procedure.

16. The method of claim 1, further comprising:
   initiating, by the second client, a storage transaction comprising operations that modify the portion of the shared persistent storage;
   creating, by the second client, the transaction marker on the shared persistent storage; and
   abandoning, by the second client, the storage transaction in response to a failure.

17. The method of claim 16, wherein creating the transaction marker and destroying the transaction marker are each performed atomically.

18. A system comprising:
a memory;
a processing device executing a first client that is operatively coupled to the memory, the processing device to:
access a transaction marker that is stored on a portion of shared persistent storage and indicates indicating a modification of the portion by a second client is incomplete, wherein the transaction marker is accessible over a network by multiple clients and comprises a pre-defined tag of a logical volume of the portion or a pre-defined extension of a filename of the portion;
access a locking data structure associated with the portion of the shared persistent storage, wherein the locking data structure is stored on the shared persistent storage;
detect, in view of the locking data structure, that the portion of the shared persistent storage is unlocked;
determine, in view of the locking data structure and the transaction marker, that the modification of the shared persistent storage is abandoned by the second client;
release the portion of the shared persistent storage associated with the modification by the second client; and
destroy the transaction marker.

19. The system of claim 18, wherein the shared persistent storage comprises a persistent data storage device that is accessed by the processing device over a local area network (LAN) connection.

20. A non-transitory machine-readable storage medium storing instructions that cause a processing device to:
access, by a first client, a transaction marker that is stored on a portion of shared persistent storage and that indicates a modification of the portion by a second client is incomplete, wherein the transaction marker is accessible over a network by multiple clients and comprises a pre-defined tag of a logical volume of the portion or a pre-defined filename extension of the portion;
access, by the first client, a locking data structure associated with the portion of the shared persistent storage, wherein the locking data structure is stored on the shared persistent storage;
detect, by the first client in view of the locking data structure, that the portion of the shared persistent storage is unlocked;
determine, by the first client in view of the locking data structure and the transaction marker, that the modification of the shared persistent storage is abandoned by the second client;
release, by the first client, the portion of the shared persistent storage associated with the modification by the second client; and
destroy, by the first client, the transaction marker.

* * * * *